US011209793B2

United States Patent
Tsuchiya (10) Patent No.: US 11,209,793 B2
(45) Date of Patent: Dec. 28, 2021

(54) CONTROLLER FOR MACHINE TOOL AND CONTROL SYSTEM

(71) Applicant: FANUC CORPORATION, Yamanashi (JP)

(72) Inventor: Masahiko Tsuchiya, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/924,183

(22) Filed: Jul. 9, 2020

(65) Prior Publication Data
US 2021/0018891 A1    Jan. 21, 2021

(30) Foreign Application Priority Data

Jul. 19, 2019  (JP) .............................. JP2019-133967

(51) Int. Cl.
*G05B 19/402* (2006.01)
*B23Q 15/12* (2006.01)
*G05B 19/414* (2006.01)

(52) U.S. Cl.
CPC ........... *G05B 19/402* (2013.01); *B23Q 15/12* (2013.01); *G05B 19/4147* (2013.01); *G05B 2219/45215* (2013.01)

(58) Field of Classification Search
None
See application file for complete search history.

(56) References Cited

U.S. PATENT DOCUMENTS

| | | | | |
|---|---|---|---|---|
| 4,173,786 A | * | 11/1979 | Kuhnell | G05B 19/186 318/571 |
| 2006/0210370 A1 | * | 9/2006 | Mizukami | G05B 19/4166 409/66 |
| 2015/0227129 A1 | * | 8/2015 | Yoshida | G05B 19/182 700/160 |

FOREIGN PATENT DOCUMENTS

JP              2006995 A        1/2006

* cited by examiner

*Primary Examiner* — Ryan A Jarrett
(74) *Attorney, Agent, or Firm* — Hauptman Ham, LLP (57) ABSTRACT

In a machine tool that performs threading, a thread-cutting startable area parallel to an X-axis of the machine tool is set based on a timing when a relative feed rate between a tool and a workpiece reaches a thread-cutting feed rate after the tool starts cutting feed. Then, movement of the tool in an X-axis direction is started first, and a rotation position of a spindle is monitored. When a thread-cutting start angle of the spindle is detected, cutting feed in a Z-axis direction of the tool is started if the tool travels in the thread-cutting startable area.

9 Claims, 11 Drawing Sheets

LINEAR ACCELERATION/DECELERATION

FIG.4B

SERVO SYSTEM

CONTROLLER FOR MACHINE TOOL AND CONTROL SYSTEM

The present application claims priority to Japanese Patent Application Number 2019-133967 filed Jul. 19, 2019, the disclosure of which is hereby incorporated by reference herein in its entirety.

BACKGROUND OF THE INVENTION

1. Field of the Invention

The present invention relates to a controller and a control system for a machine tool for performing thread-cutting.

2. Description of the Related Art

At the time of performing threading using a machine tool, there may be a case where thread-cutting is not completed by one operation, but is repeated a plurality of times while a cut in an X-axis direction is gradually deepened to machine one screw. In the case of performing such threading, it is necessary to make an adjustment so that the phase of spiral track of the screw is not displaced during the thread-cutting performed the plurality of times. In a conventional machine tool, the phase of spiral track of a screw is adjusted by waiting for detection of a one-rotation signal of a spindle, and starting thread-cutting when the one-rotation signal is detected.

Figure 11:
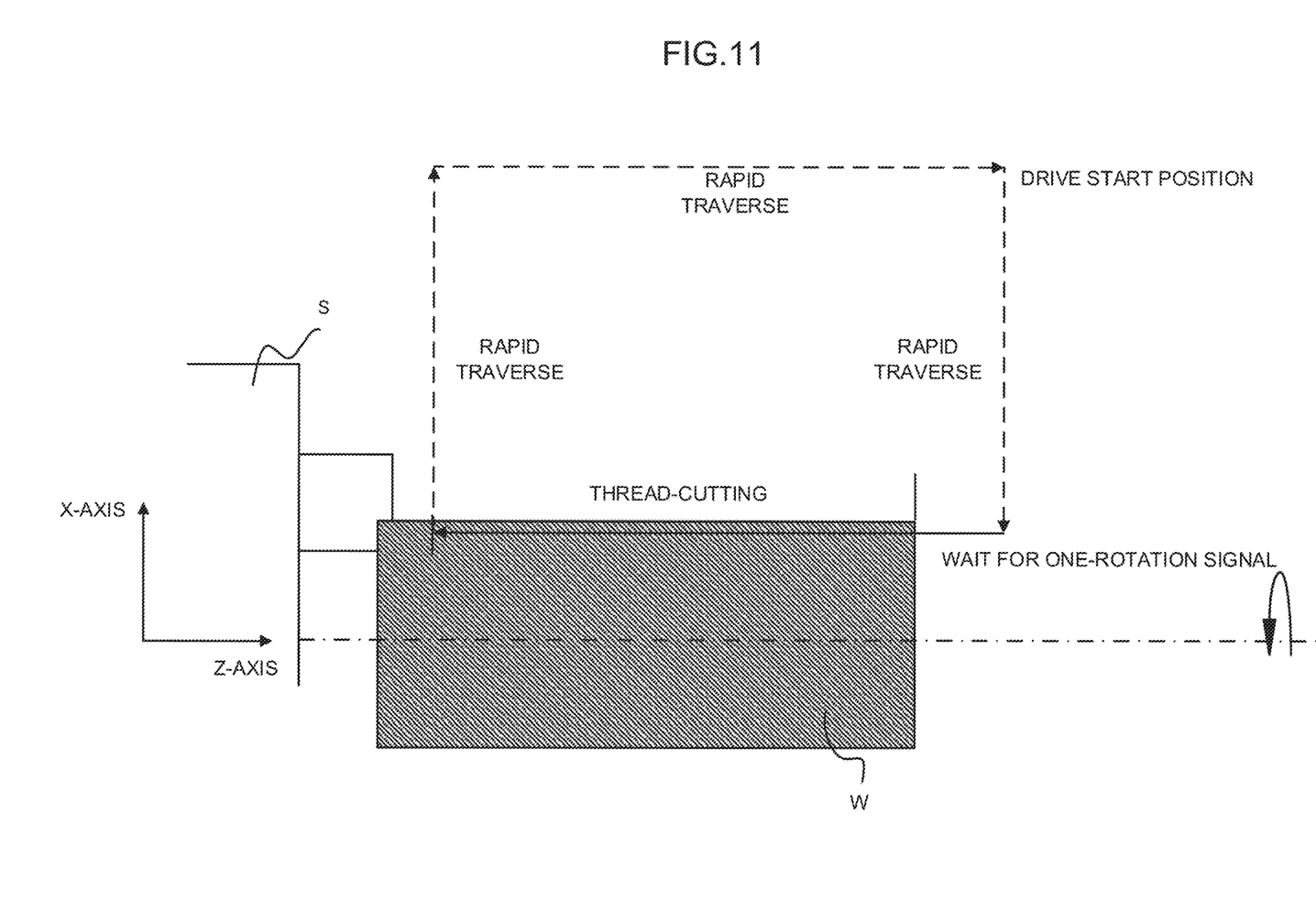
FIG. 11 is a diagram illustrating a moving route of a tool in conventional threading.

FIG. 11 is a schematic diagram showing a conventional method for driving a tool. The tool waits at a drive start position first, and moves to a thread-cutting depth along the X-axis by rapid traverse according to a control signal from a servo control portion. Then, the tool waits for a one-rotation signal of a spindle, starts thread-cutting feed at a time of detection of one-rotation signal, moves in a Z-axis minus direction and starts thread-cutting. When thread-cutting ends, the tool is moved in an X-axis plus direction by rapid traverse and is kept away from a workpiece. Furthermore, the tool is moved in a Z-axis plus direction to be returned to the initial drive start position. This series of operations is repeated to perform threading.

A threading apparatus disclosed in Japanese Patent Application Laid-Open No. 2006-995 shortens a length of an incomplete screw portion and increases a spindle rotation speed to shorten total machining time of the threading by causing the spindle rotation speed in the case of machining of the incomplete screw portion with a thread groove shallower than a prescribed thread groove to be smaller than a spindle rotation speed in the case of machining of an effective screw portion with the prescribed thread groove as well as interpolating and controlling at least only a first axis, among the first axis in an axial direction of a spindle and a second axis orthogonal to the first axis.

In the case of machining of one screw by repeating thread-cutting a plurality of times, the tool repeatedly moves on the same track as shown in FIG. 11. If cycle time for such machining is shortened, the machining time of threading is shortened, and work efficiency is improved.

SUMMARY OF THE INVENTION

Therefore, there is a demand for a technique to improve efficiency of threading.

A controller according to an aspect of the present invention controls a machine tool provided with a first axis causing a tool to move in an axial direction of a spindle and a second axis causing the tool to move in a direction different from an axial direction of the first axis, the machine tool driving the tool by the first axis and the second axis to perform threading of a workpiece attached to the spindle. The controller is provided deciding a thread-cutting startable area in a direction of the second axis of the tool, based on a timing when a relative feed rate between the tool and the workpiece reaches a thread-cutting feed rate after the tool starts cutting feed in a direction of the first axis; and a thread-cutting start timing deciding portion starting the cutting feed of the tool when a position of the tool on the second axis is within a range of the thread-cutting startable area.

The thread-cutting startable area deciding portion may decide the thread-cutting startable area so that the tool reaches a thread-cutting depth position when the tool reaches the thread-cutting feed rate.

The thread-cutting startable area deciding portion may narrow a range of the thread-cutting startable area so that the tool reaches the thread-cutting depth position before the tool reaches the thread-cutting feed rate.

The thread-cutting startable area deciding portion may widen the range of the thread-cutting startable area if the tool reaches the thread-cutting feed rate in front of the workpiece.

The controller may be further provided with a rotation position detecting portion detecting a rotation position of the spindle. When the rotation position detection portion detects a predetermined rotation position, the thread-cutting start timing deciding portion may start driving of the tool.

The thread-cutting startable area deciding portion may be provided with: a feed rate calculating portion calculating a relative feed rate between the tool and the workpiece after the cutting feed is started until the thread-cutting feed rate is reached; and a time-to-reach-thread-cutting feed rate calculating portion calculating time to reach the thread-cutting feed rate, which is required for the relative feed rate to reach the thread-cutting feed rate, based on the relative feed rate. The thread-cutting startable area deciding portion may calculate the range of the thread-cutting startable area based on the time to reach the thread-cutting feed rate.

The thread-cutting start timing deciding portion may look ahead a program instructing the machine tool to perform an operation, and, if a thread-cutting instruction exists in the program, monitors a position of the spindle in advance to start driving of the tool at a timing when the spindle is at a predetermined position.

The controller may be further provided with a passage amount adjusting portion accelerating, based on a passage amount after the spindle passes a predetermined rotation position, the relative feed rate of the tool according to the passage amount to offset the passage amount.

A control system according to an aspect of the present invention is a control system controlling a machine tool provided with a first axis causing a tool to move in an axial direction of a spindle and a second axis causing the tool to move in a direction different from an axial direction of the first axis, the machine tool driving the tool by the first axis and the second axis to perform threading of a workpiece attached to the spindle, the control system including: a thread-cutting startable area deciding portion deciding a thread-cutting startable area in a direction of the second axis of the tool, based on a timing when a relative feed rate between the tool and the workpiece reaches a thread-cutting feed rate after the tool starts cutting feed in a direction of the first axis; and a thread-cutting start timing deciding portion starting the cutting feed of the tool when a position of the tool on the second axis is within a range of the thread-cutting startable area.

Having the above configuration, the present invention can shorten time required for threading.

DETAILED DESCRIPTION OF THE PREFERRED EMBODIMENTS

Figure 1:
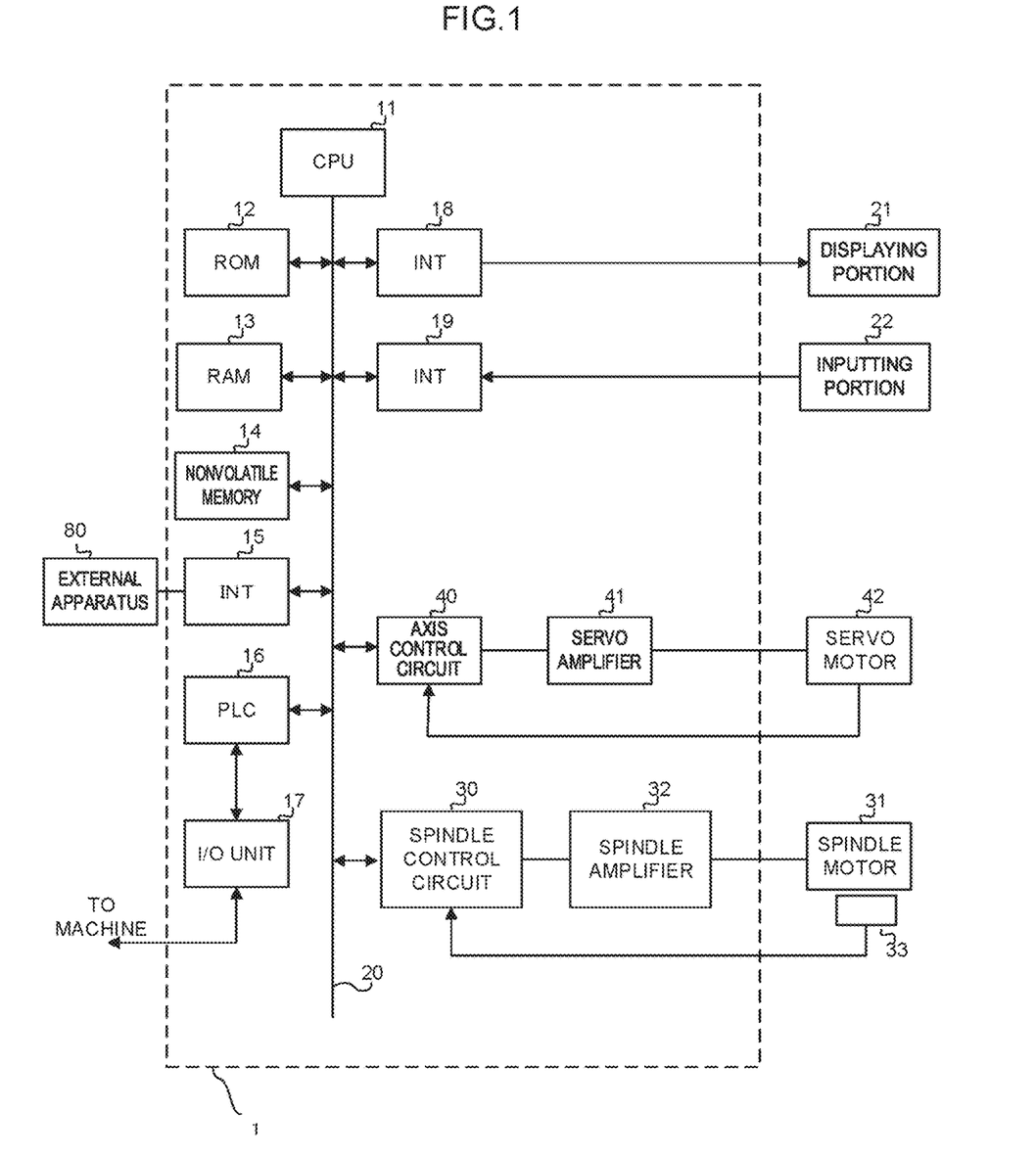
FIG. 1 is a schematic hardware configuration diagram of a numerical controller in an embodiment of the present invention.

FIG. 1 is a schematic hardware configuration diagram showing a main part of a numerical controller 1 in which a controller is implemented according to an embodiment.

A CPU 11 provided in the numerical controller 1 according to the present embodiment is a processor that entirely controls the numerical controller 1. The CPU 11 reads out a system program stored in a ROM 12 via a bus, and controls the entire numerical controller 1 according to the system program. In a RAM 13, temporary calculation data and display data, various kinds of data inputted by an operator via an inputting portion 22, and the like are temporarily stored.

A nonvolatile memory 14 is configured, for example, with a memory, an FD (floppy disk drive), an HDD (hard disk drive) or an SSD (solid state drive) backed up by a battery (not shown), and a stored state is held even if the numerical controller 1 is powered off. In the nonvolatile memory 14, a program read in from an external apparatus 80 via an interface 15, a program inputted via an inputting portion 22, and various kinds of data acquired from each portion of the numerical controller 1, a machine tool and the like (for example, setting parameters acquired from the machine tool, and the like) are stored. The programs and various kinds of data stored in the nonvolatile memory 14 may be developed on the RAM 13 at the time of being executed/used. Further, in the ROM 12, various kinds of system programs such as a publicly known analysis program are written in advance.

The interface 15 is an interface for connecting the numerical controller 1 and the external apparatus 80 such as an adapter. Programs, various kinds of parameters and the like are read in from the external apparatus 80 side. Further, programs, various kinds of parameters and the like edited in the numerical controller 1 can be stored into external storage means (not shown) via the external apparatus 80. A programmable logic controller (PLC) 16 performs input/output of signals between the numerical controller 1 and peripheral devices of the machine tool, a robot, and devices such as sensors attached to the machine tool and the robot by a sequence program included in the numerical controller 1 via an I/O unit 17 to perform control.

On a displaying portion 21, each data read onto the memory, data obtained as a result of execution of a program or the like, or the like is outputted and displayed via an interface 18. Further, the inputting portion 22 configured with an MDI, an operation panel, a touch panel or the like hands over an instruction, data or the like based on an operation by a worker to the CPU 11 via an interface 19.

An axis control circuit 40 for controlling each axis of the machine tool receives a tool movement command from the CPU 11 and outputs the tool movement command to a servo amplifier 41. Receiving this instruction, the servo amplifier 41 drives a servo motor 42 that causes a tool provided on the machine tool to move. The servo motor 42 includes a position/speed detector (not shown) and feeds back a position/speed feedback signal from this position/speed detector to the axis control circuit 40 to perform position/speed feedback control. Note that, though only one axis control circuit 40, one servo amplifier 41 and one servo motor 42 are shown in the hardware configuration diagram of FIG. 1, but, in reality, they are provided in a number corresponding to the number of axes provided on a control target machine tool (in the present embodiment, two axes of an X-axis and a Z-axis) are prepared.

A spindle control circuit 30 receives a spindle rotation command to a spindle of the machine tool and outputs a spindle rotation speed signal to a spindle amplifier 32. Receiving this spindle rotation speed signal, the spindle amplifier 32 causes a spindle motor 31 of the spindle to rotate at the instructed rotation speed. A position coder 33 (to be described later) is coupled with the spindle motor 31. The position coder 33 outputs a feedback pulse in synchronization with the rotation of the spindle, and the feedback pulse is read by the CPU 11.

Figure 2:
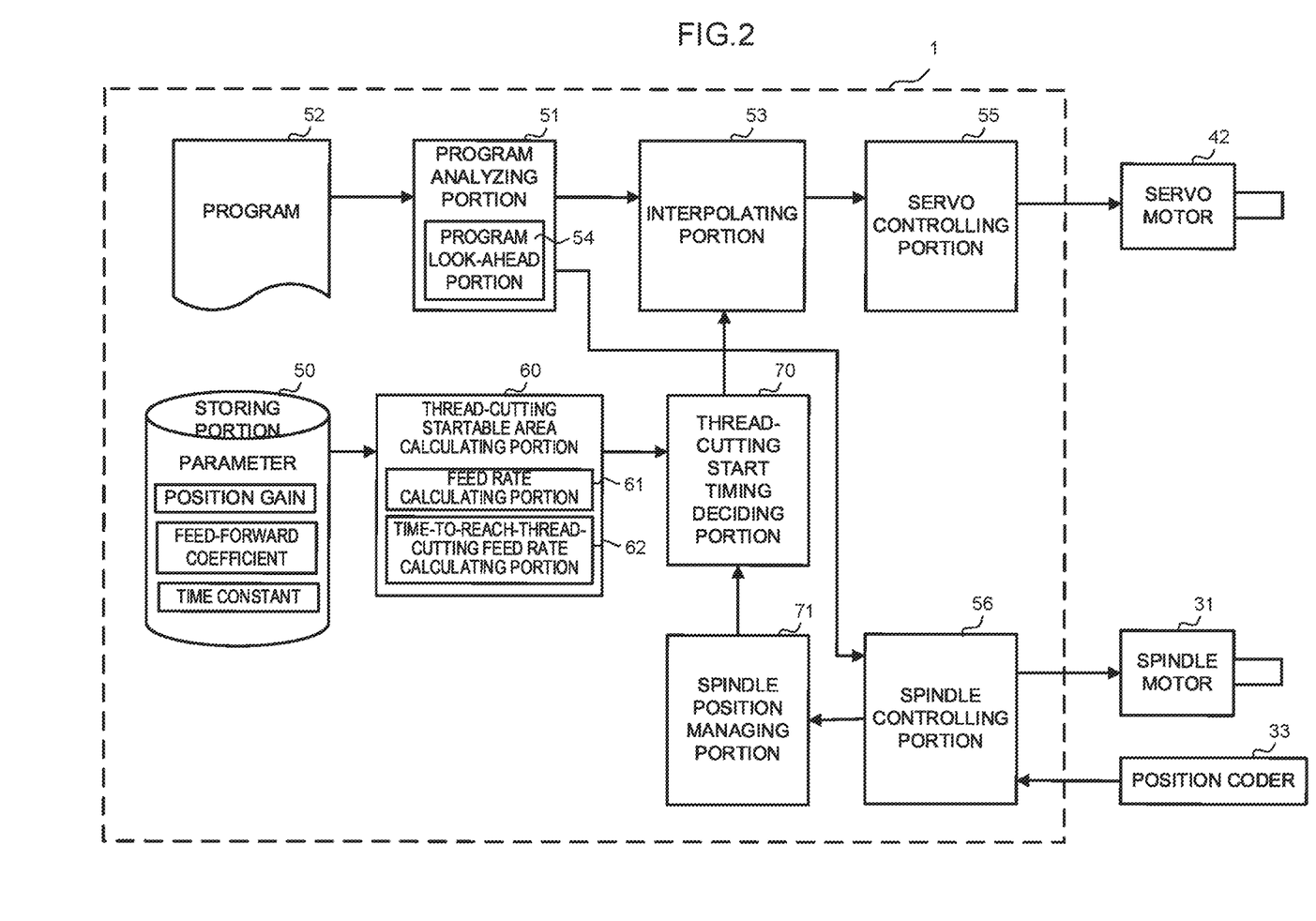
FIG. 2 is a functional block diagram of the numerical controller in the embodiment of the present invention.

FIG. 2 is a functional block diagram of a numerical controller in which a controller according to the present invention is implemented.

The numerical controller 1 controls a thread-cutting operation of a machine tool (not shown). This machine tool is provided, for example, with a spindle S that causes a workpiece W to rotate and a turret to which a tool T is attached, the tool T which forms a thread on a surface of the workpiece W attached to the spindle S. The turret to which the tool T is attached is relatively movable with respect to the workpiece W by two axes, a first axis in an axial direction of the spindle S and a second axis in a direction different from the axial direction of the spindle S. In the present embodiment, the first axis and the second axis are called a Z-axis and an X-axis, respectively.

A program analyzing portion 51 is implemented by having the CPU 11 provided in the numerical controller 1 shown in FIG. 1 execute the system program read out from the ROM 12 so that, mainly the CPU 11 performs arithmetic processing using the RAM 13 and the nonvolatile memory 14. The program analyzing portion 51 reads out a program 52 stored in a predetermined storage area (not shown) provided on the nonvolatile memory 14, analyzes content of the program 52 and creates a movement command to be sent to an interpolating portion 53 and a spindle rotation command to be sent to a spindle controlling portion 56. The program analyzing portion 51 is provided with a program look-ahead portion 54 that looks ahead the program 52. The program look-ahead portion 54 determines whether or not a thread-cutting start instruction exists in the look-ahead program 52, and, if the thread-cutting start instruction exists, causes a thread-cutting start timing deciding portion 70 (to be described later) to output rotation position information about the spindle S.

The interpolating portion 53 is implemented by having the CPU 11 provided in the numerical controller 1 shown in FIG. 1 execute the system program read out from the ROM 12 so that, mainly the CPU 11 performs arithmetic processing using the RAM 13 and the nonvolatile memory 14. The interpolating portion 53 creates interpolation data obtained by performing interpolation calculation of an instruction route of the tool T for each interpolation cycle based on the movement command instructed from the program analyzing portion 51, and outputs the created interpolation data to a servo controlling portion 55.

The servo controlling portion 55 is implemented by having the CPU 11 provided in the numerical controller 1 shown in FIG. 1 executes the system program read out from the ROM 12 so that mainly, the CPU 11 performs arithmetic processing using the RAM 13 and the nonvolatile memory 14 and controls processing of the servo motor 42 by the axis control circuit 40 and the servo amplifier 41. The servo controlling portion 55 drives the tool T according to the instruction route by controlling the servo motor 42 based on the interpolation data created by the interpolating portion 53.

The spindle controlling portion 56 is implemented by having the CPU 11 provided in the numerical controller 1 shown in FIG. 1 execute the system program read out from the ROM 12 so that mainly, the CPU 11 performs arithmetic processing using the RAM 13 and the nonvolatile memory 14 and controls processing of the spindle motor 31 by the axis control circuit 30 and the spindle amplifier 32. The spindle controlling portion 56 controls rotation of the spindle motor 31 according to a spindle rotation command from the program analyzing portion 51 to drive the rotation of the workpiece W. The position coder 33 detects a rotation position of the spindle S and hands over the detected rotation position to the spindle controlling portion 56. A spindle position managing portion 71 continuously manages the position of the spindle S based on a signal from the spindle controlling portion 56.

A thread-cutting startable area calculating portion 60 is implemented by having the CPU 11 provided in the numerical controller 1 shown in FIG. 1 execute the system program read out from the ROM 12 so that mainly, the CPU 11 performs arithmetic processing using the RAM 13 and the nonvolatile memory 14. The thread-cutting startable area calculating portion 60 calculates a thread-cutting startable area.

In the present embodiment, thread-cutting start means start of cutting feed. The thread-cutting startable area refers to an area on the X-axis calculated so that, when cutting feed is started in that area, a position of the X-axis reaches a thread-cutting depth at or before an end point of an incomplete screw portion. In the thread-cutting startable area, it is possible to perform thread-cutting at an appropriate thread-cutting feed rate no matter where the thread-cutting is started.

Figure 3:
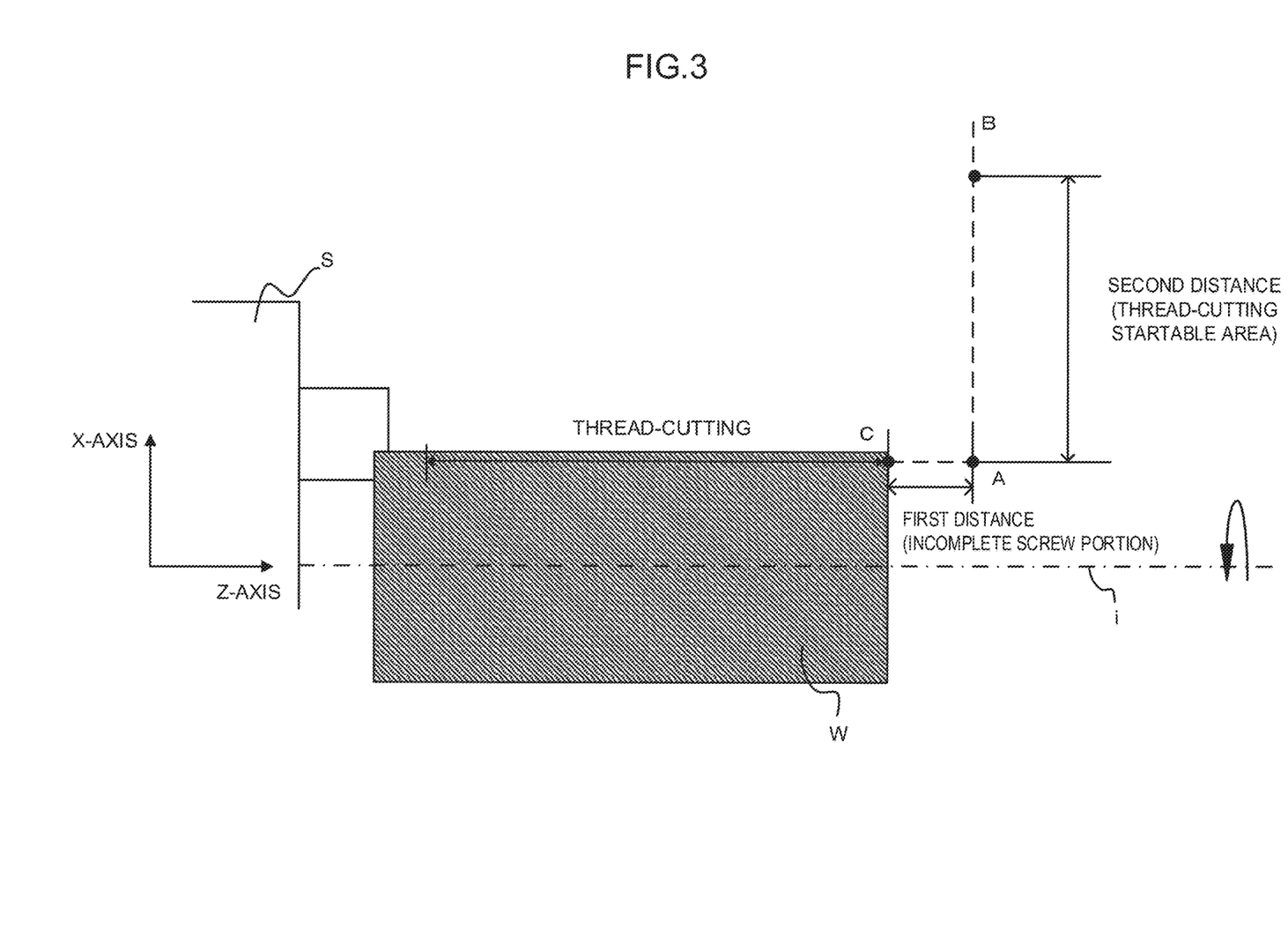
FIG. 3 is a diagram illustrating a thread-cutting startable area.

FIG. 3 shows an example of the thread-cutting startable area.

As shown in FIG. 3, the thread-cutting startable area is a range between a position A away from an end point C of the incomplete screw portion by a first distance on the Z-axis and a position B away from the position A by a second distance in an X-axis plus direction. Here, the first distance means a distance required for a relative feed rate in the Z-axis direction between the tool T and the workpiece W to reach the thread-cutting feed rate after cutting feed of the tool T is started on the Z-axis. At a stage before reaching the first distance, the tool T has not reached the thread-cutting feed rate, and, therefore, cannot perform complete thread-cutting. Since thread-cutting is incomplete within a range of the first distance, the range is called an incomplete screw portion in the present embodiment.

Note that, in FIG. 3, reference symbol S indicates the spindle, and reference symbol i indicates a rotation center axis of the workpiece W. The second distance is a distance the tool T moves in the X-axis direction during a period until the relative feed rate in the Z-axis direction between the tool T and the workpiece W reaches the thread-cutting feed rate and corresponds to the range (width) of the thread-cutting startable area.

The thread-cutting startable area calculating portion 60 is provided with a feed rate calculating portion 61 and a time-to-reach-thread-cutting feed rate calculating portion 62. The feed rate calculating portion 61 calculates the relative feed rate in the Z-axis direction between the tool T and the workpiece W until the relative feed rate reaches the thread-cutting feed rate after cutting feed of the tool T in the Z-axis direction is started.

The time-to-reach-thread-cutting feed rate calculating portion 62 calculates time to reach the thread-cutting feed rate, which is time required until the relative feed rate between the tool T and the workpiece W reaches the thread-cutting feed rate, based on the thread-cutting feed rate calculated by the feed rate calculating portion 61. The thread-cutting startable area calculating portion 60 calculates a distance the tool T moves in the X-axis direction during the time to reach the thread-cutting feed rate, that is, the second distance.

Figure 4A:
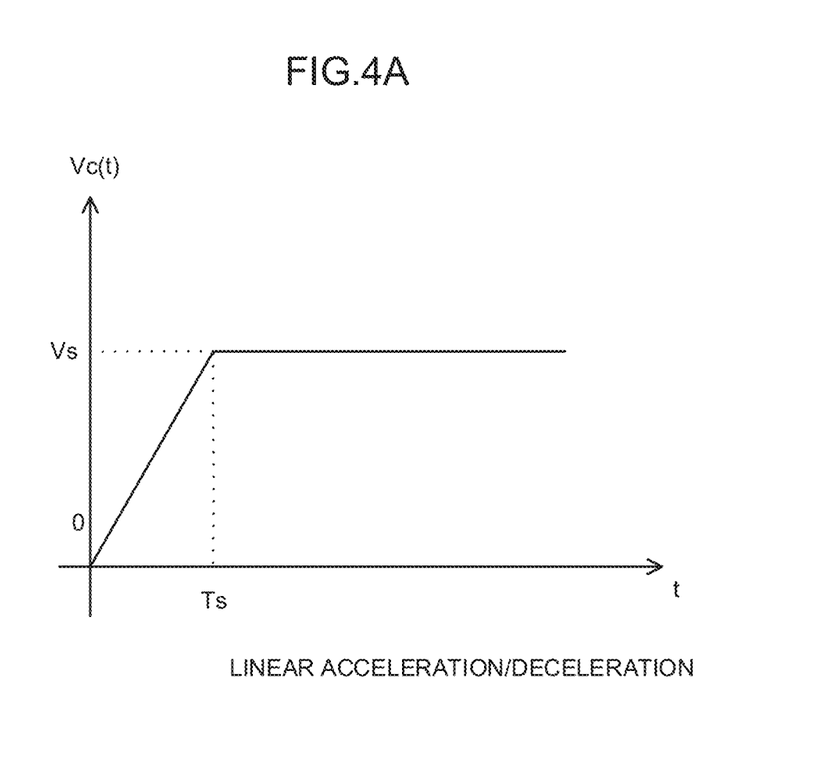
FIGS. 4A and 4B are diagrams illustrating a speed instruction for a thread-cutting feed rate in the case of linear acceleration/deceleration.
Figure 4B:
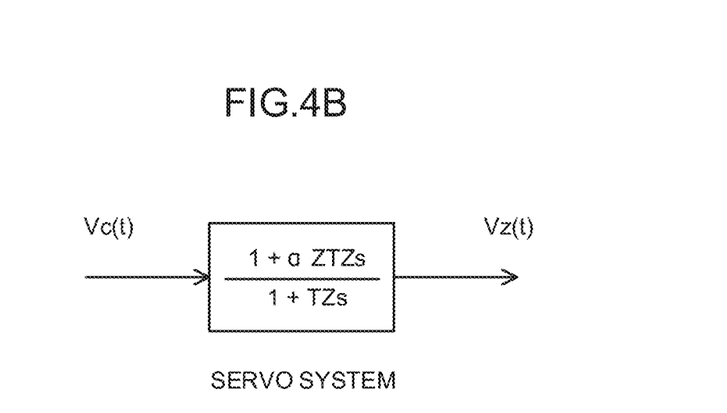

Here, an example of calculation of the thread-cutting startable area in the case of linear acceleration/deceleration is shown with reference to FIGS. 4A and 4B.

FIG. 4A shows change in a thread-cutting feed rate command in linear acceleration/deceleration, and FIG. 4B shows a transfer function between the thread-cutting feed rate command and the thread-cutting feed rate. In this condition, the thread-cutting feed rate $v_z(t)$ [m/sec] at time t is expressed by Formula 1 below. The feed rate calculating portion 61 solves Formula (1) as below to calculate the thread-cutting feed rate.

When $0 \leq t < T_S$ is satisfied, $$v_Z(t) = V_S \left[ \frac{1}{T_S} t - (1 - \alpha_Z) \frac{T_Z}{T_S} \left\{ 1 - e^{\frac{-t}{T_Z}} \right\} \right]$$

When $T_S \leq t$ is satisfied, $$v_Z(t) = V_S \left[ 1 - (1 - \alpha_Z) \frac{T_Z}{T_S} e^{\frac{-t}{T_Z}} \left\{ e^{\frac{T_S}{T_Z}} - 1 \right\} \right] \quad (1)$$

Here, $V_S$ is commanded thread-cutting feed rate [m/sec]; $T_S$ is an acceleration/deceleration time constant [sec] after thread-cutting interpolation; $T_Z$ is a Z-axis servo system time constant [sec]; and $\alpha_Z$ is a Z-axis feed-forward coefficient. Such parameters are stored in a storing portion 50.

The second term in the square brackets in Formula (1) above (the underlined part) indicates a rate until the tool T reaches the commanded thread-cutting feed instruction speed. When the value of this term falls within a tolerance range, it can be considered that the relative feed rate between the tool T and the workpiece W has reached the thread-cutting feed rate. When a screw lead is indicated by L [m], and an allowable error is indicated by ΔL [m], time $t_S$ [sec] at which the relative feed rate between the tool T and the workpiece W can be regarded as having reached the thread-cutting feed rate can be calculated from Formula (2) below. The time-to-reach-thread-cutting feed rate calculating portion 62 solves Formula (2) as below to calculate the time to reach the thread-cutting feed rate.

$$t_s = T_Z \ln\left[(1 - \alpha_Z)\frac{T_Z}{T_S}\left(e^{\frac{T_S}{T_Z}} - 1\right)\frac{L}{\Delta L}\right] \quad (2)$$

When a range of the thread-cutting startable area is indicated by $\delta_x$ [m], $\delta_x$ is calculated by Formula (3) below based on the time $t_s$ at which the relative feed rate between the tool T and the workpiece W can be regarded as having reached the thread-cutting feed rate. The thread-cutting startable area calculating portion 60 solves Formula (3) as below to calculate the range of the thread-cutting startable area.

When $0 \le t_s < T_r$ is satisfied $$\delta_x = V_r\left[\frac{1}{2T_r}t_s^2 - (1 - \alpha_x)\frac{T_x}{T_r}\left\{t_s - T_x + T_x e^{\frac{-t_s}{T_x}}\right\}\right]$$

When $T_r \le t_s$ is satisfied, $$\delta_x = V_r\left[t_s - \frac{1}{2}T_r - (1 - \alpha_x)T_x\left\{1 - \frac{T_x}{T_r}e^{\frac{-t_s}{T_x}}\left(e^{\frac{T_r}{T_x}} - 1\right)\right\}\right] \quad (3)$$

Here, $V_r$ is a commanded X-axis rapid traverse rate [m/sec]; $T_r$ is acceleration/deceleration time constant [sec] after rapid traverse interpolation; $T_X$ is an X-axis servo system time constant [sec]; and $\alpha_X$ is an X-axis feed-forward coefficient. Such parameters are stored in the storing portion 50. Here, $\delta_x$ is a distance the tool T moves on the X-axis until the relative feed rate between the tool T and the workpiece W reaches the thread-cutting feed rate after thread-cutting is started. When thread-cutting is started at the point A of the thread-cutting depth, cutting feed is performed parallel to the Z-axis direction similarly to the conventional technique. When thread-cutting is started at the point B which is the farthest from the thread-cutting depth, a timing at which the tool T reaches an end point C of the incomplete screw portion and a timing at which the tool T reaches the thread-cutting depth are the same. In other words, the thread-cutting startable area is an area where movement of the tool T to the thread-cutting depth is completed before the tool T passes through the end point C of the incomplete screw portion.

Note that, if it is desired to secure an allowance so that the tool T reaches the thread-cutting depth before the end point C of the incomplete screw portion, the range of the thread-cutting startable area can only be made narrower than the range calculated by Formula (3) above. Further, if the tool T reaches the cutting feed rate in front of the workpiece W (that is, if the workpiece W is attached away from the end point C of the incomplete screw portion in the Z-axis minus direction), the range of the thread-cutting startable area may be made wider than the range calculated by Formula (3) above. In this case, a position where the X-axis reaches the thread-cutting depth is a position exceeding the end point C of the incomplete screw portion. By Formula (3), the thread-cutting startable area can be automatically calculated so that movement to the thread-cutting depth is completed before the tool T passes through the end point C of the incomplete screw portion. Furthermore, it is also possible to adjust the calculated thread-cutting startable area according to purposes.

The thread-cutting start timing deciding portion 70 is implemented by having the CPU 11 provided in the numerical controller 1 shown in FIG. 1 execute the system program read out from the ROM 12 so that mainly, the CPU performs arithmetic processing using the RAM 13 and the nonvolatile memory 14. The thread-cutting start timing deciding portion 70 decides a timing to start thread-cutting, which is cutting feed in the Z-axis direction. The thread-cutting start timing deciding portion 70 determines whether the tool T exists in the thread-cutting startable area or not, and, if the tool T is included in the thread-cutting startable area, the thread-cutting start timing deciding portion 70 starts a thread-cutting start timing decision process. When decision of the thread-cutting start timing is started, the thread-cutting start timing deciding portion 70 inputs position information about the spindle S from the spindle position managing portion 71. When the spindle S reaches a predetermined position (for example, a position where a one-rotation signal is detected), the thread-cutting start timing deciding portion 70 instructs the interpolating portion 53 to start thread-cutting.

Then, when receiving a thread-cutting start signal from the thread-cutting start timing deciding portion 70, the interpolating portion 53 outputs interpolation data created based on a thread-cutting instruction to the servo controlling portion 55.

Figure 5:
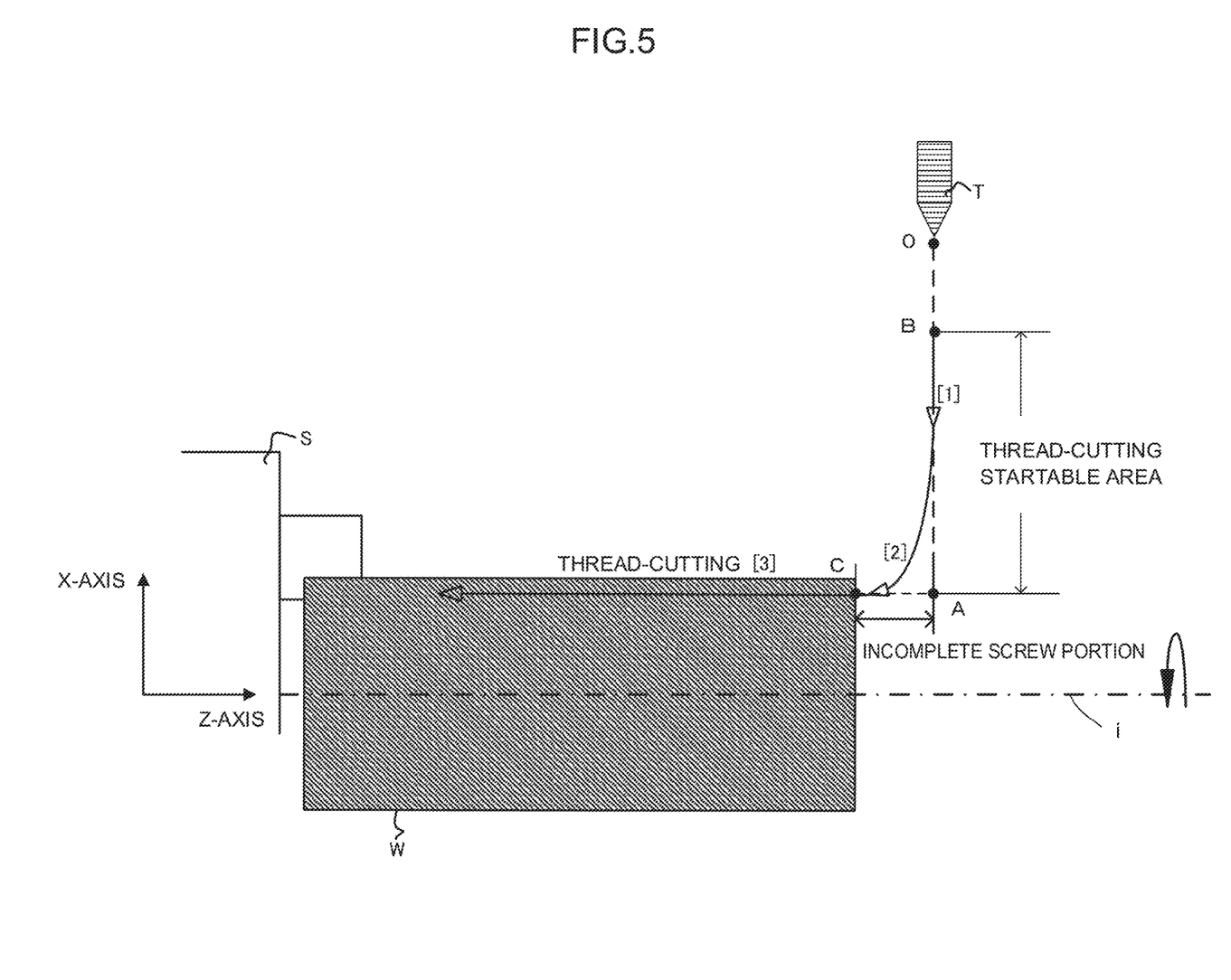
FIG. 5 is a diagram showing a tool driving route.

FIG. 5 shows an example of a movement route of a tool.

In the example of FIG. 5, the tool T waits at a drive start position O first. Then, movement of the tool T in an X-axis minus direction is started so as to cause the tool T to move to the thread-cutting depth ([1]). Note that the drive start position O of the tool T is calculated so that the drive start position O is away from the end point C of the incomplete screw portion in the Z-axis direction by a distance enough for the relative feed rate between the tool T and the workpiece W to reach the thread-cutting feed rate. The drive start position O of the tool T may be included in the thread-cutting startable area to be described later or may be a position that is not included in the thread-cutting startable area. In the example of FIG. 5, the drive start position O is set at a position a little far away from the thread-cutting startable area.

When the tool T moves in the X-axis minus direction, and the tool T enters the range of the thread-cutting startable area, the thread-cutting start timing deciding portion 70 receives the rotation position of the spindle S from the spindle position managing portion 71. When the spindle S reaches a predetermined thread-cutting start angle (for example, a position where the one-rotation signal is detected), the thread-cutting start timing deciding portion 70 instructs the interpolating portion 53 to start thread-cutting. The interpolating portion 53 starts cutting feed (thread-cutting) of the tool T according to the instruction. Though the tool T is driven only in the X-axis direction before the cutting feed is started, the tool T is accelerated in the Z-axis direction when the cutting feed is started. Therefore, the movement route of the tool T forms a curved line as shown in FIG. 5 ([2]). A position of the tool T in the X-axis direction reaches the thread-cutting depth before the end point C of the incomplete screw portion, and the speed of the tool T in the Z-axis direction reaches the thread-cutting feed rate at the end point C of the incomplete screw portion. When passing through the end point C of the incomplete screw portion, the tool T performs thread-cutting on the surface of the workpiece W at a predetermined thread-cutting feed rate ([3]).

As described above, if thread-cutting is started when the one-rotation signal of the spindle S is detected at an arbitrary position in the thread-cutting startable area, the tool T starts thread-cutting at the same position on the surface of the workpiece W when the tool T passes through the end point C of the incomplete screw portion, because time required for reaching the end point C of the incomplete screw portion is the same. Thus, it is possible to cause the spiral track of the screw to accord.

Figure 6:
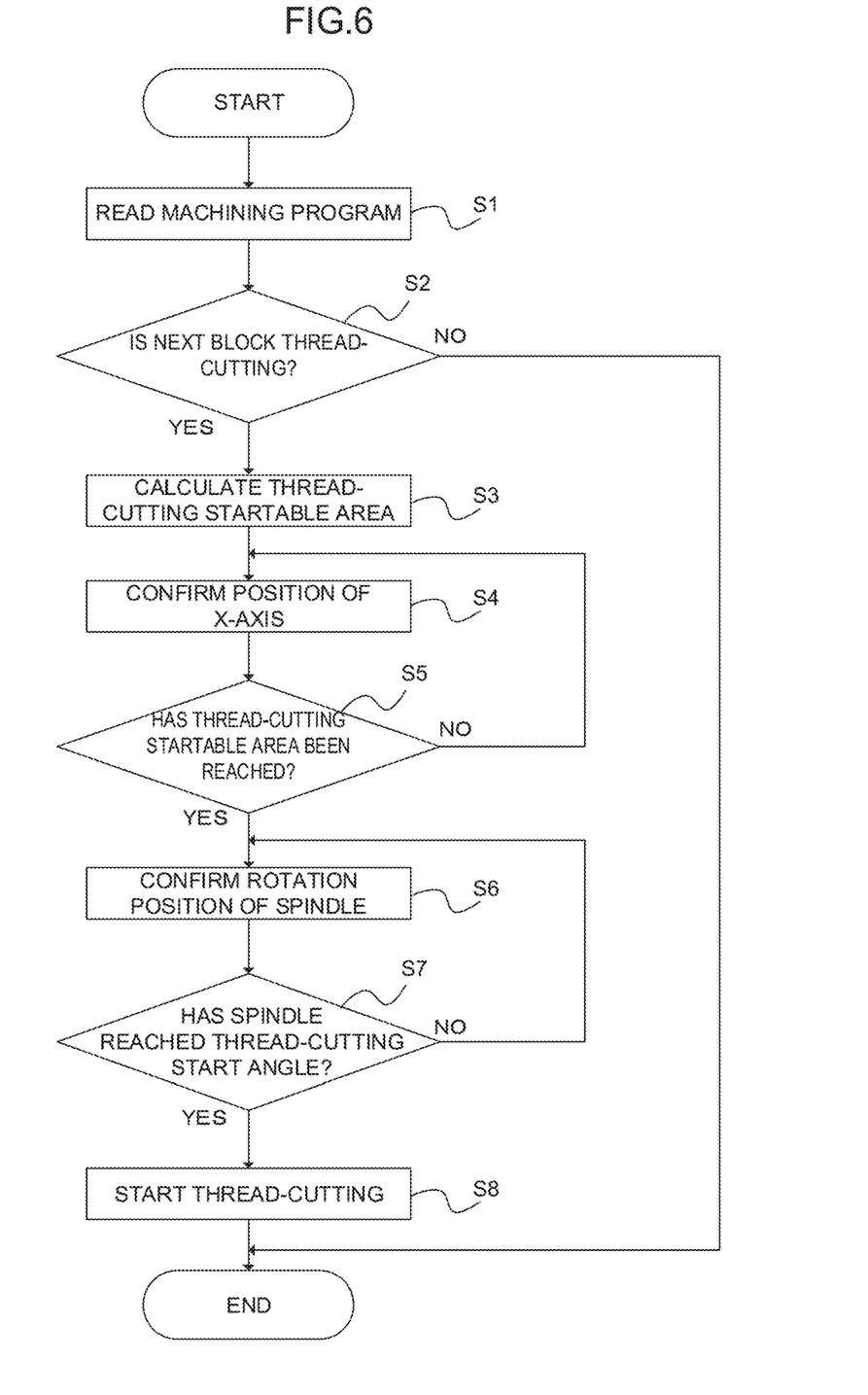
FIG. 6 is a flowchart illustrating an operation of the numerical controller.

Next, an operation of the numerical controller 1 will be described with reference to FIG. 6.

First, the program analyzing portion 51 reads out the program 52 from a predetermined storage area (step S1). The program analyzing portion 51 analyzes the read-out program and outputs an instruction signal to the interpolating portion 53 and the spindle controlling portion 56. At the same time, the program look-ahead portion 54 reads out a program ahead of the analysis target program and determines whether a thread-cutting instruction exists in the read-out program or not. If the thread-cutting instruction does not exist in the program ahead of the analysis target program (step S2: NO), the interpolating portion 53 does not perform a thread-cutting start process. If the thread-cutting instruction exists in the look-ahead program (step S2: YES), the thread-cutting startable area calculating portion 60 calculates the thread-cutting startable area based on time required for reaching the thread-cutting feed rate of the tool T (step S3).

Next, the thread-cutting start timing deciding portion 70 confirms a position of the tool T on the X-axis (step S4). Here, if the position of the tool T on the X-axis is included in the thread-cutting startable area (step S5: YES), the thread-cutting start timing deciding portion 70 confirms the rotation position of the spindle S (step S6). Further, if the position of the tool T on the X-axis is not included in the thread-cutting startable area (step S5: NO), the process returns to step S3, and monitoring of the position of the tool T is continued until the position of the tool T on the X-axis is included in the thread-cutting startable area.

Further, if the rotation position of the spindle S has reached the thread-cutting start angle as a result of confirmation of the rotation position of the spindle S at step S6 (step S7: YES), the thread-cutting start timing deciding portion 70 outputs a thread-cutting start instruction to the interpolating portion 53.

When the thread-cutting start instruction is inputted, the interpolating portion 53 outputs a control signal to the servo controlling portion 55 to start a thread-cutting operation (a cutting feed operation in the Z-axis direction) (step S8). Further, if the rotation position of the spindle S has not reached the thread-cutting start angle at step S7 (step S7: NO), the thread-cutting start timing deciding portion 70 returns to step S6 and continues confirmation of the rotation position of the spindle S.

As described above, the numerical controller 1 of the present embodiment causes the tool T to be driven in the X-axis direction first. Then, after the tool T enters the thread-cutting startable area, the numerical controller 1 monitors the rotation of the spindle S, and, at a time when the spindle S reaches the thread-cutting start angle, instructs the interpolating portion 53 to start thread-cutting.

Figure 7:
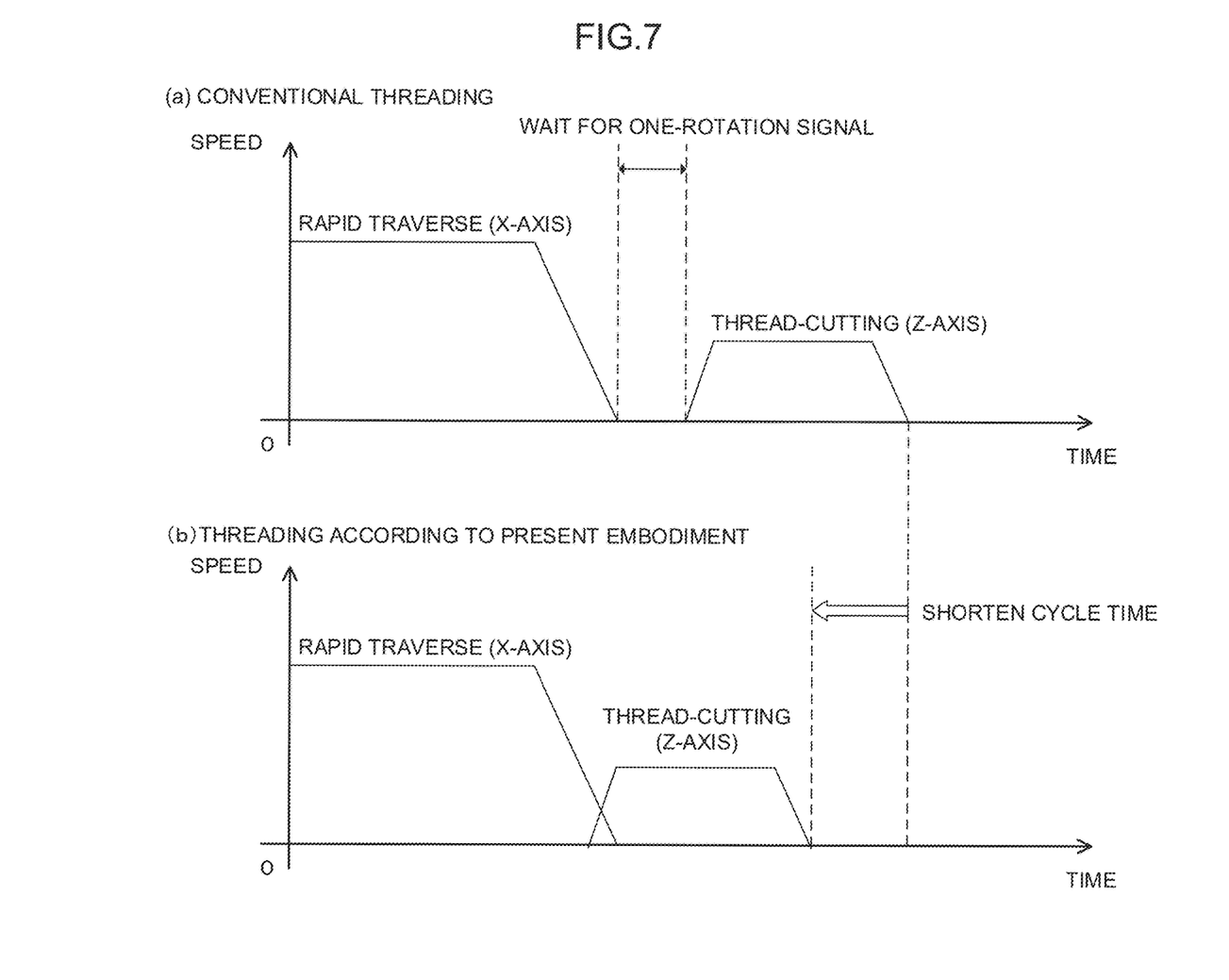
FIG. 7 is a diagram illustrating a difference from a conventional numerical controller in cycle time.

The threading of the numerical controller according to the present embodiment and threading of a conventional numerical controller will be compared with reference to FIG. 7.

As shown in (a) in FIG. 7, the conventional numerical controller waits until the rotation position of the spindle S reaches the position where the one-rotation signal is outputted after causing the tool T to move to the thread-cutting depth in the X-axis minus direction, and then starts thread-cutting in the Z-axis direction. In contrast, as shown in (b) in FIG. 7, the numerical controller 1 according to the present embodiment starts thread-cutting in the Z-axis direction at a time when the rotation position of the spindle S outputs the one-rotation signal while driving the tool T in the X-axis direction. Therefore, it becomes possible to start thread-cutting in the Z-axis direction during rapid traverse in the X-axis direction. Thus, time for waiting the one-rotation signal is not required, and cycle time is shortened.

Figure 8:
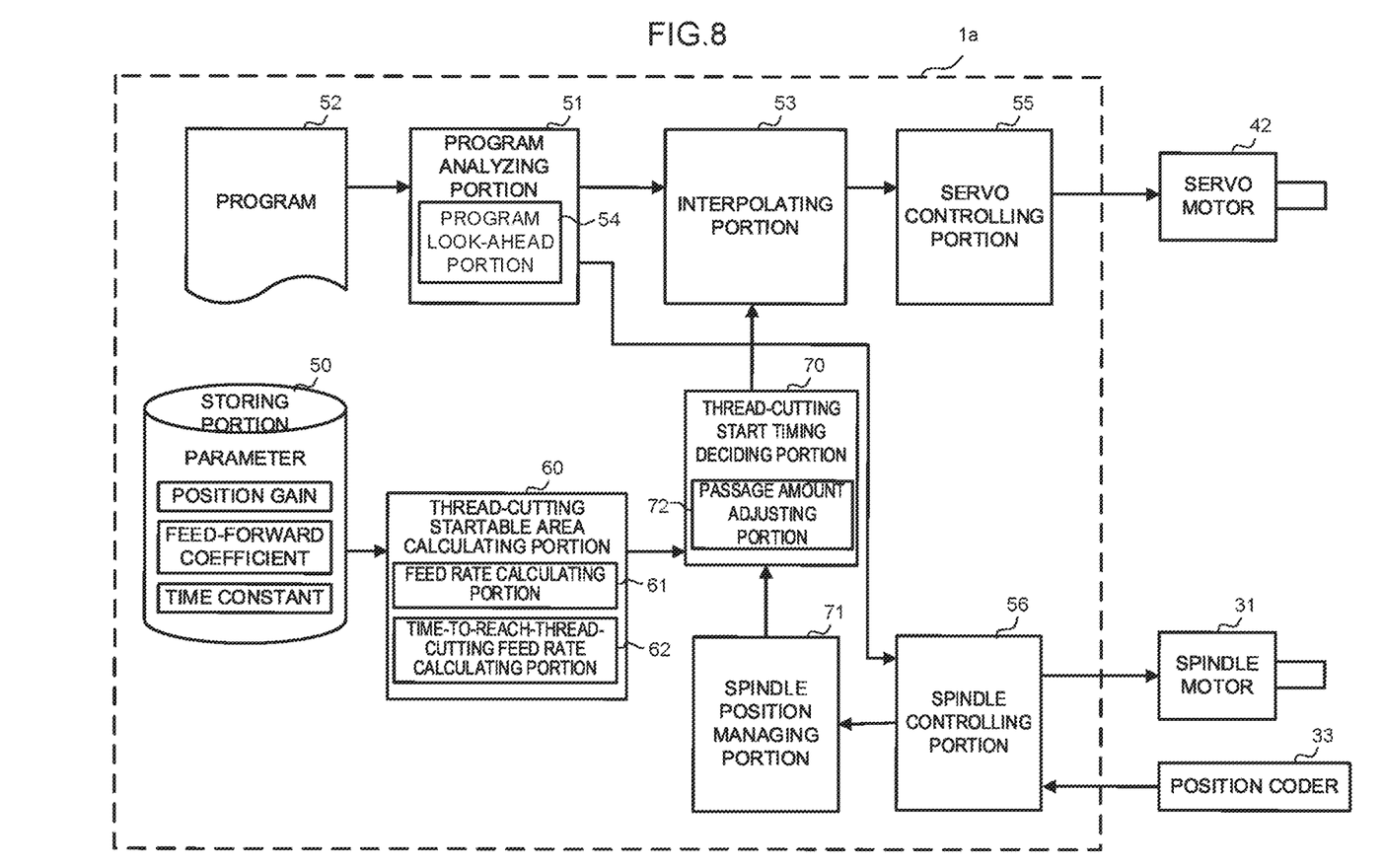
FIG. 8 is a block diagram of a numerical controller including a passage amount adjusting portion.

Next, a numerical controller 1a according to another embodiment that is provided with a passage amount adjusting portion 72 is shown in FIG. 8.

The thread-cutting start timing deciding portion 70 in FIG. 8 has the passage amount adjusting portion 72. The passage amount adjusting portion 72 outputs pulses (hereinafter referred to as "a Z-axis delay amount") corresponding to a passage amount by which the Z-axis moves while, after the rotation position of the spindle S has already passed the position where the one-rotation signal is outputted, moving from a rotation position of the spindle S where thread-cutting is originally to be started to a current rotation position of the spindle S, as an instruction pulse, to the Z-axis, thereby offsetting the Z-axis delay amount and causing the phase of thread-cutting to accord.

More specifically, when the thread-cutting start timing deciding portion 70 instructs the interpolating portion 53 to start a thread-cutting operation (start of movement of the Z-axis), the passage amount adjusting portion 72 instructs adjustment so that, among interpolation data for the thread-cutting operation generated by the interpolating portion 53, a pulse amount of the first control cycle outputted to the servo motor 42 that drives the Z-axis becomes a pulse amount corresponding to "the Z-axis delay amount". By performing such adjustment, acceleration at the time of starting thread-cutting in the Z-axis direction is large as compared with the acceleration at the time of starting normal movement of the Z-axis. However, since the necessity of waiting to start thread-cutting until the rotation position of the spindle S comes to the thread-cutting start angle is eliminated, it becomes possible to shorten the cycle time of threading.

Figure 9:
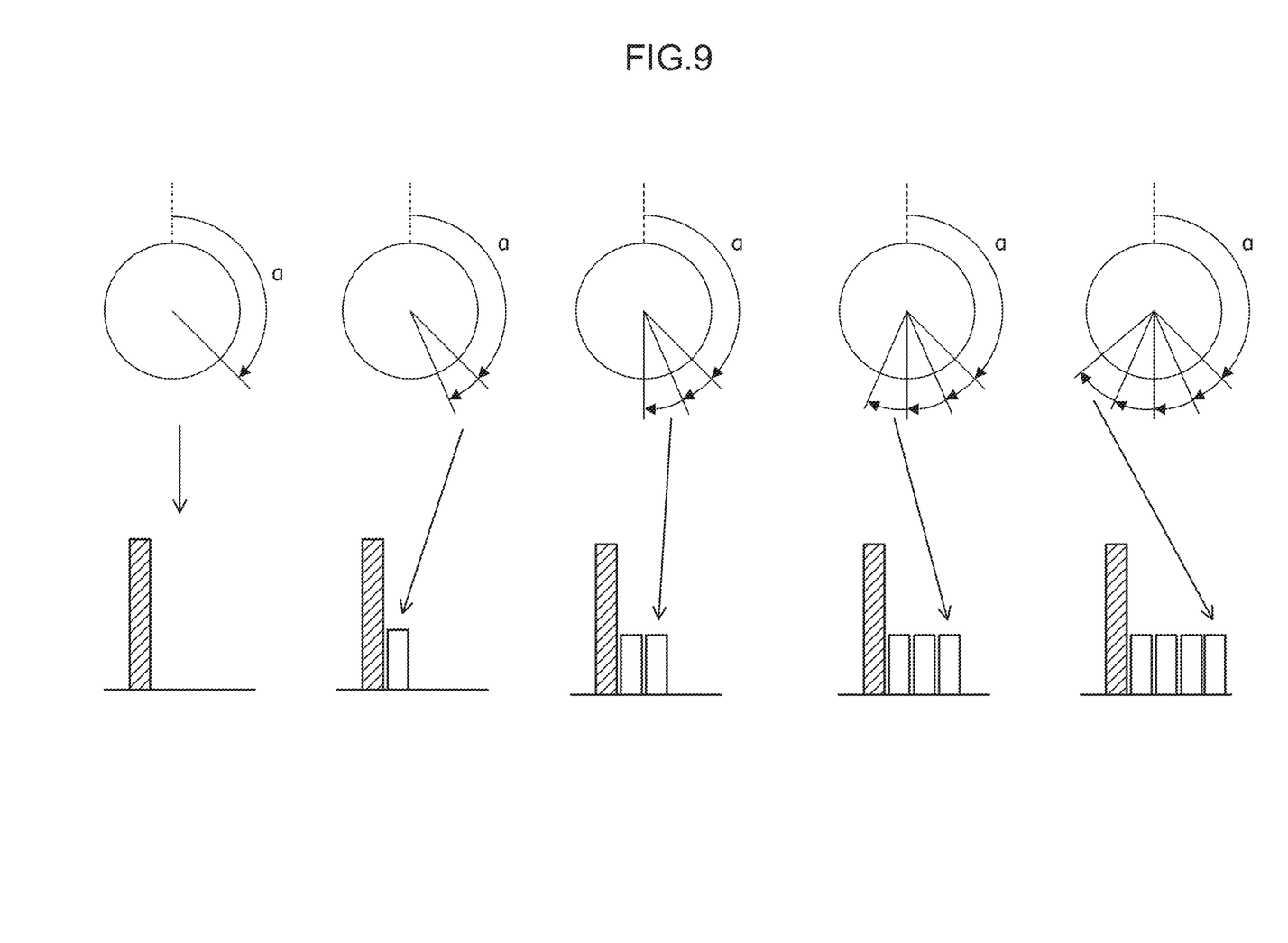
FIG. 9 is a diagram illustrating a process of the passage amount adjusting portion.

To explain this with reference to FIG. 9, when an amount of passage from the thread-cutting start angle (for example, a position which passed the one-rotation signal) detected by the position coder 33 is indicated by α, the passage amount adjusting portion 72 calculates an instruction pulse (the Z-axis delay amount) corresponding to an amount of passage (a movement amount from start of movement of the Z-axis) by which the Z-axis moves during time the spindle S moves by the passage amount α, and instructs the interpolating portion 53 to adjust a pulse amount of the first control cycle of the interpolation data for the thread-cutting operation generated by the interpolating portion 53, to the amount of the calculated instruction pulse. When the servo controlling portion 55 accelerates the servo motor 42 according to the adjusted interpolation data, the Z-axis delay amount is offset, and delay in the thread-cutting feed rate from the one-rotation signal is cancelled. After the delay in the speed is cancelled, the thread-cutting feed rate is adjusted by a conventional control. Thus, it is possible to accelerate the thread-cutting feed rate by an amount corresponding to delay without waiting for the one-rotation signal to cause the spiral track of thread-cutting to accord.

Figure 10:
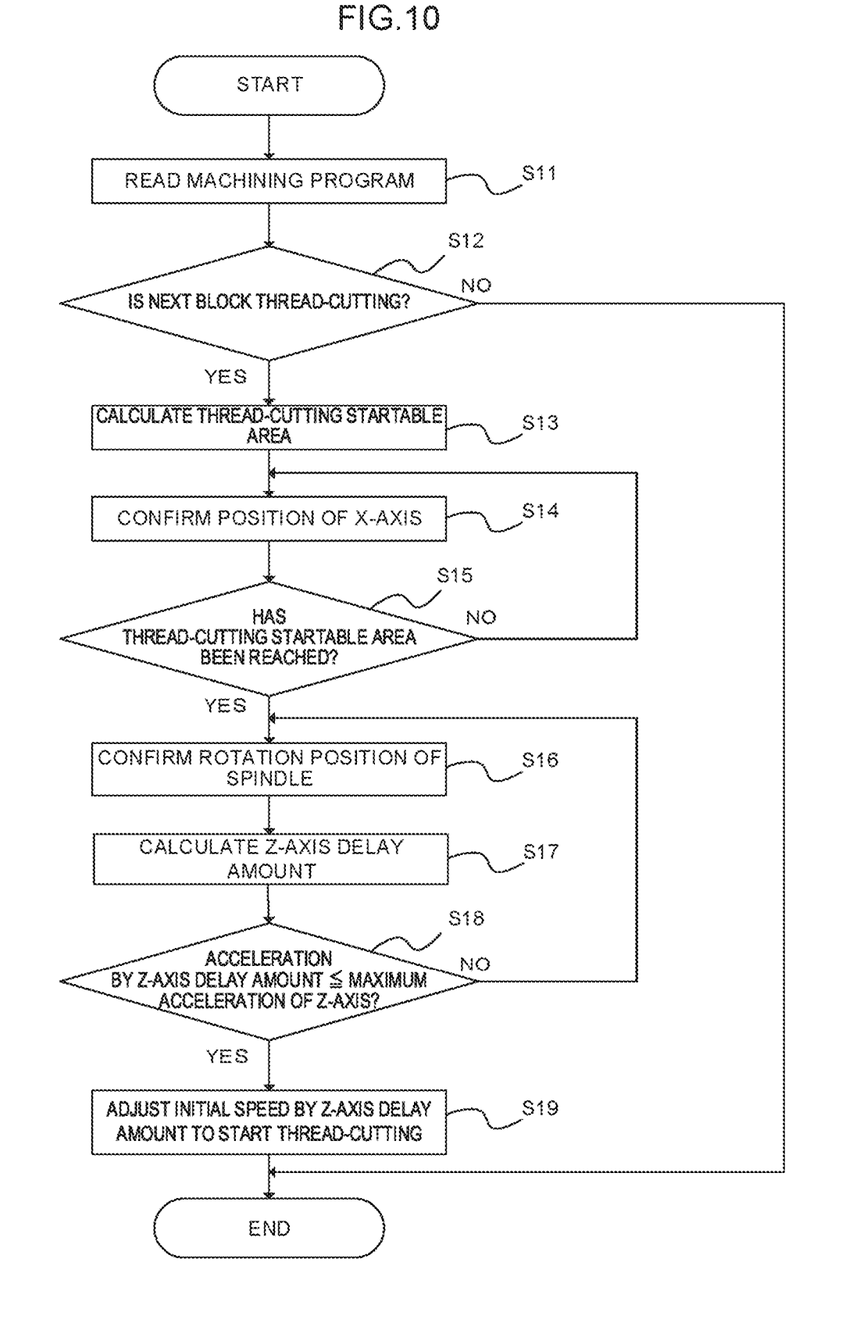
FIG. 10 is a flowchart illustrating an operation of the passage amount adjusting portion.

An operation of the numerical controller 1a according to the present embodiment will be described with reference to FIG. 10.

First, the program analyzing portion 51 reads out the program 52 from a predetermined storage area (step S11). The program analyzing portion 51 analyzes the read-out program and outputs an instruction signal to the interpolating portion 53 and the spindle controlling portion 56. At the same time, the program look-ahead portion 54 reads out a program ahead of the analysis target program and determines whether or not a thread-cutting instruction exists there. If the thread-cutting instruction does not exist in the program ahead of the analysis target program (step S12: NO), the interpolating portion 53 does not perform the thread-cutting start process. If the thread-cutting instruction exists in the look-ahead program (step S12: YES), the thread-cutting startable area calculating portion 60 calculates the thread-cutting startable area based on the time required for reaching the thread-cutting feed rate of the tool T (step S13).

Next, the thread-cutting start timing deciding portion 70 confirms the position of the tool T on the X-axis (step S14). Here, if the position of the tool T on the X-axis is included in the thread-cutting startable area (step S15: YES), the thread-cutting start timing deciding portion 70 confirms the rotation position of the spindle S (step S16) and calculates the Z-axis delay amount based on the rotation position of the spindle S (step S17). Further, if the position of the tool T on the X-axis is not included in the thread-cutting startable area (step S15: NO), the process is returned to step S14, and monitoring of the position of the tool T is continued until the position of the tool T on the X-axis is included in the thread-cutting startable area.

Further, if, as a result of calculation of the Z-axis delay amount based on the rotation position of the spindle S at step S17, acceleration in the case of accelerating the Z-axis by the calculated Z-axis delay amount is equal to or below the maximum acceleration set for the Z-axis (step S18: YES), the thread-cutting start timing deciding portion 70 and the passage amount adjusting portion 72 output a thread-cutting start instruction in which the initial speed is adjusted by the Z-axis delay amount to the interpolating portion 53. If the acceleration in the case of accelerating the Z-axis by the Z-axis delay amount exceeds the maximum acceleration set for the Z-axis (step S18: NO), the process is returned to step S16, and monitoring of the spindle rotation position is continued.

The embodiments of the present invention have been described above. The present invention, however, is not limited to the examples of the embodiments described above but can be practiced in various aspects by making appropriate changes.

For example, though an example of a case where a screw portion to be processed is parallel to a Z-axis is described in the embodiments described above, the technique of the present invention is also used, for example, in a case where the screw portion is inclined relative to the Z-axis by a predetermined angle. In such a case, the Z-axis is driven similarly to the embodiments described above, and threading is performed by moving the X-axis according to the angle of the screw portion. By deciding a timing of starting movement of the Z-axis in a thread-cutting operation similarly to the embodiments described above, it is possible to, while a spiral track of a screw is caused to accord, shorten cycle time in comparison with a general thread-cutting method.

The invention claimed is:

1. A controller controlling a machine tool provided with a first axis causing a tool to move in an axial direction of a spindle and a second axis causing the tool to move in a direction different from an axial direction of the first axis, the machine tool driving the tool by the first axis and the second axis to perform threading of a workpiece attached to the spindle, the controller comprising:
   a thread-cutting startable area deciding portion deciding a thread-cutting startable area in a direction of the second axis of the tool, based on a timing when a relative feed rate between the tool and the workpiece reaches a thread-cutting feed rate after the tool starts cutting feed in a direction of the first axis; and
   a thread-cutting start timing deciding portion starting the cutting feed of the tool when a position of the tool on the second axis is within a range of the thread-cutting startable area.

2. The controller according to claim 1, wherein the thread-cutting startable area deciding portion decides the thread-cutting startable area so that the tool reaches a thread-cutting depth position when the tool reaches the thread-cutting feed rate.

3. The controller according to claim 1, wherein the thread-cutting startable area deciding portion narrows a range of the thread-cutting startable area so that the tool reaches the thread-cutting depth position before the tool reaches the thread-cutting feed rate.

4. The controller according to claim 1, wherein the thread-cutting startable area deciding portion widens the range of the thread-cutting startable area if the tool reaches the thread-cutting feed rate in front of the workpiece.

5. The controller according to claim 1, further comprising a rotation position detecting portion detecting a rotation position of the spindle, wherein
   when the rotation position detecting portion detects a predetermined rotation position, the thread-cutting start timing deciding portion starts driving of the tool.

6. The controller according to claim 1, wherein
   the thread-cutting startable area deciding portion comprises:
   a feed rate calculating portion calculating a relative feed rate between the tool and the workpiece after the cutting feed is started until the thread-cutting feed rate is reached; and
   a time-to-reach-thread-cutting feed rate calculating portion calculating time to reach the thread-cutting feed rate, which is required for the relative feed rate to reach the thread-cutting feed rate, based on the relative feed rate; wherein
   the thread-cutting startable area deciding portion calculates the range of the thread-cutting startable area based on the time to reach the thread-cutting feed rate.

7. The controller according to claim 1, wherein the thread-cutting start timing deciding portion looks ahead a program instructing the machine tool to perform an operation, and, if a thread-cutting instruction exists in the program, monitors a position of the spindle in advance to start driving of the tool at a timing when the spindle is at a predetermined position.

8. The controller according to claim 1, further comprising a passage amount adjusting portion accelerating, based on a passage amount after the spindle passes a predetermined rotation position, the relative feed rate of the tool according to the passage amount to offset the passage amount.

9. A control system controlling a machine tool provided with a first axis causing a tool to move in an axial direction of a spindle and a second axis causing the tool to move in a direction different from an axial direction of the first axis, the machine tool driving the tool by the first axis and the second axis to perform threading of a workpiece attached to the spindle, the control system comprising:
   a thread-cutting startable area deciding portion deciding a thread-cutting startable area in a direction of the second axis of the tool, based on a timing when a relative feed rate between the tool and the workpiece reaches a thread-cutting feed rate after the tool starts cutting feed in a direction of the first axis; and
   a thread-cutting start timing deciding portion starting the cutting feed of the tool when a position of the tool on the second axis is within a range of the thread-cutting startable area.

* * * * *